US009113060B2

(12) United States Patent
Akiyama

(10) Patent No.: US 9,113,060 B2
(45) Date of Patent: Aug. 18, 2015

(54) IMAGE DISPLAY DEVICE WITH OPERATION UNIT EXCELLENT IN OPERABILITY AND IMAGE PICKUP APPARATUS HAVING THE SAME

(75) Inventor: Satoru Akiyama, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 17 days.

(21) Appl. No.: 13/617,281

(22) Filed: Sep. 14, 2012

(65) Prior Publication Data

US 2013/0107101 A1   May 2, 2013

(30) Foreign Application Priority Data

Oct. 31, 2011  (JP) ................................ 2011-238796

(51) Int. Cl.
*H04N 5/222* (2006.01)
*H04N 5/225* (2006.01)
*H04N 5/232* (2006.01)

(52) U.S. Cl.
CPC ......... *H04N 5/2251* (2013.01); *H04N 5/23293* (2013.01)

(58) Field of Classification Search
CPC ................................................ H04N 5/23293
USPC ..................................... 348/333.07; 352/243
See application file for complete search history.

(56) References Cited

U.S. PATENT DOCUMENTS

| 4,946,272 | A  | * | 8/1990 | Brown | .......................... 352/243 |
| 7,508,444 | B1 | * | 3/2009 | Napoli et al. | ................. 348/372 |
| 7,630,621 | B2 | * | 12/2009 | Tanaka et al. | ................. 396/106 |
| 2009/0295975 | A1 | * | 12/2009 | Takahashi et al. | ....... 348/333.01 |

FOREIGN PATENT DOCUMENTS

JP           3669244 B2     7/2005

* cited by examiner

*Primary Examiner* — Joel Fosselman
(74) *Attorney, Agent, or Firm* — Rossi, Kimms & McDowell LLP

(57) ABSTRACT

An image display device that improves the operability of its operation unit when operated by a photographer/user in a state that an image display unit of the device has been adjusted to assume an angle where the photographer/user can easily view a displayed image. The image display device is coupled through its mounting unit to an image pickup apparatus main unit and causes the image display unit to display an image captured by the apparatus main unit. The image display device has an operation unit configured to be operated to control the apparatus main unit and the image display unit. The image display unit is coupled through a hinge mechanism to the operation unit for rotation relative thereto and the operation unit is coupled through a rotary mechanism to the mounting unit for rotation relative thereto about a rotation axis perpendicular to an operation face of the operation unit.

13 Claims, 18 Drawing Sheets

US 9,113,060 B2

IMAGE DISPLAY DEVICE WITH OPERATION UNIT EXCELLENT IN OPERABILITY AND IMAGE PICKUP APPARATUS HAVING THE SAME

BACKGROUND OF THE INVENTION

1. Field of the Invention

The present invention relates to an image pickup apparatus such as a digital still camera, digital video camera, or the like. In particular, this invention relates to an image display device with an operation unit that is excellent in operability, and relates to an image pickup apparatus having the image display device.

2. Description of the Related Art

An image pickup apparatus such as a digital still camera, digital video camera, or the like has been in widespread use that has an image display device (hereinafter, referred to as the display device) for displaying captured images. The display device is often mounted with a relatively large-sized display panel of e.g. 3.5 inches for improvement of the visibility of displayed images.

The display device with large-sized display panel that occupies a large area when mounted on a camera main unit is disposed on e.g. a lateral side of the camera main unit. To improve the usability, some display device is configured to be coupled to the camera main unit for rotation in opening/closing directions relative to the camera main unit. It is also possible to configure the display device to be rotatable relative to the camera main unit about an axis perpendicular to the opening/closing directions of the display device, whereby an installation angle of the display device can be changed to an angle where a photographer/user can easily view a displayed image.

For example, a digital camera shown in FIGS. 27 to 32 has been proposed in Japanese Patent Publication No. 3669244.

Referring to FIGS. 27 and 28, the proposed digital camera has a monitor block 2 (display device) mounted to a camera main unit 8 by means of a mounting member 3a that has a rotary part thereof configured to be rotatable about first and second rotation axes X, Y relative to a stationary part thereof fixed to the monitor block 2. Thus, the monitor block 2 can be rotated by nearly 180 degrees relative to the camera main unit 8 about the first rotation axis X from a state of FIG. 27 to a state of FIG. 29 and can be rotated by nearly 270 degrees about the second rotation axis Y from the state of FIG. 29 to a state of FIG. 30.

By rotating the monitor block 2 from the state of FIG. 29 by nearly 180 degrees relative to the camera main unit 8 about the second rotation axis Y, it becomes possible as shown in FIG. 31 to cause a display unit of the monitor block 2 to face an object to be photographed. By rotating the monitor block 2 from the state of FIG. 31 by nearly 180 degrees relative to the camera main unit 8 about the first rotation axis X, a photographer/user becomes capable of easily viewing an image displayed on the display unit of the monitor block 2 in a state where the monitor block 2 is housed in the camera main unit 8 as shown in FIG. 32.

With the video camera disclosed in Japanese Patent Publication No. 3669244, the monitor block 2 is capable of assuming various angles relative to the camera main unit 8, whereby the visibility of an image displayed on the display unit can be improved. However, an operation unit is formed integrally with the camera main unit 8 and cannot assume an arbitrary angle relative to the camera main unit 8. As a result, the operability of the operation unit is sometimes lowered when the photographer/user operates the operation unit while viewing an image displayed on the display unit of the monitor block 2 that has been adjusted to assume an angle where the photographer/user can easily view a displayed image.

SUMMARY OF THE INVENTION

The present invention provides an image display device that improves the operability of its operation unit when operated by a photographer/user in a state that an image display unit of the device has been adjusted to assume an angle where the photographer/user can easily view a displayed image, and provides an image pickup apparatus having the image display device.

According to one aspect of this invention, there is provided an image display device, which comprises a mounting unit configured to be detachably coupled to an image pickup apparatus main unit, an image display unit configured to display an image captured by the image pickup apparatus main unit, an operation unit configured to be operated to control the image pickup apparatus main unit and the image display unit, a hinge mechanism configured to couple the image display unit to the operation unit such that the image display unit can be rotated relative to the operation unit, and a rotary mechanism configured to couple the operation unit to the mounting unit such that the operation unit can be rotated relative to the mounting unit about a rotation axis perpendicular to an operation face of the operation unit.

With this invention, it is possible to improve the operability of the operation unit of the image display device when operated by the photographer/user in a state that the image display unit has been adjusted to assume an angle where the photographer/user can easily view an image displayed on the image display unit.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
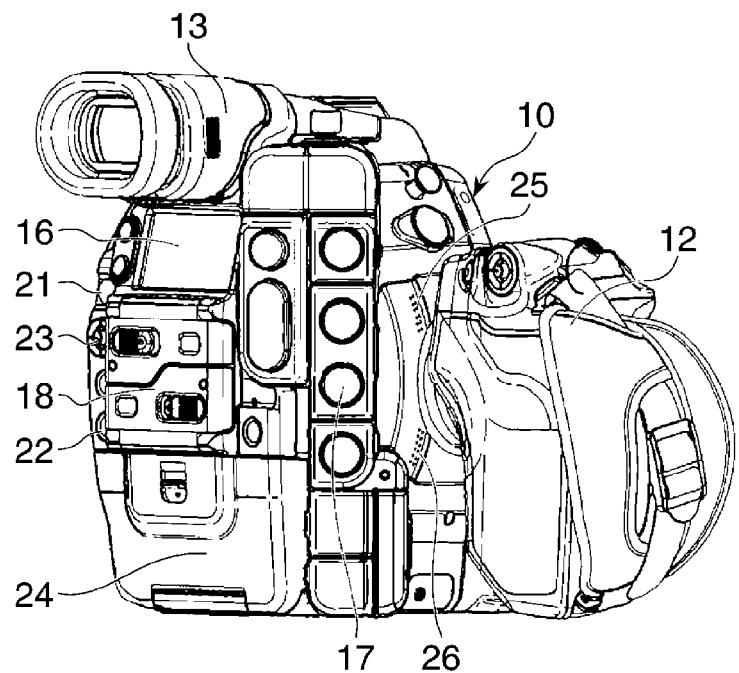
FIG. 1 is a rear perspective view showing a main unit of a digital video camera that is an example of an image pickup apparatus according to one embodiment of this invention.
Figure 2:
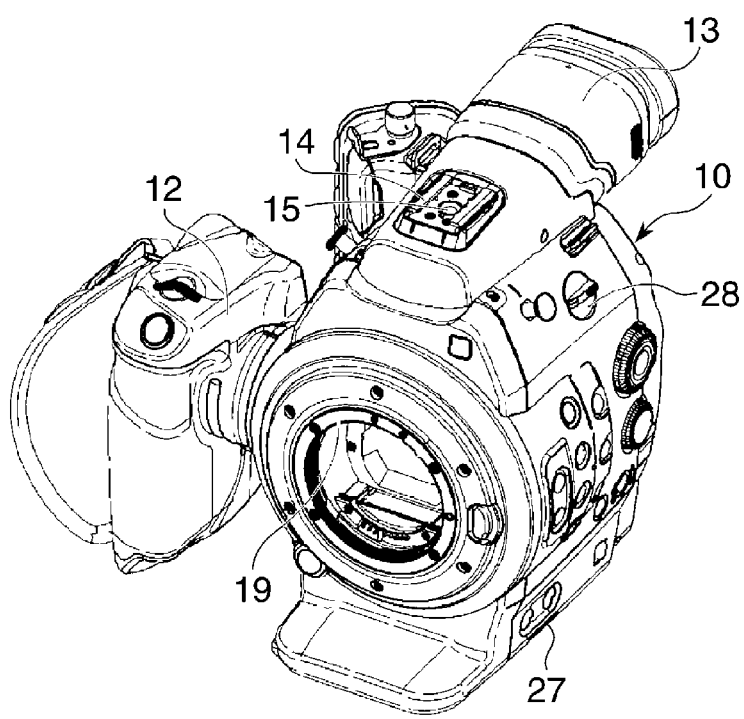
FIG. 2 is a front perspective view of the camera main unit.

FIGS. 1 and 2 respectively show in rear perspective view and in front perspective view a main unit of a digital video camera, which is an example of an image pickup apparatus according to one embodiment of this invention.

As shown in FIGS. 1 and 2, the digital video camera of this embodiment includes a camera main unit 10 (image pickup apparatus main unit) having a rear surface on which there are provided a movable view finder 13, information display part 16, input/output terminals 17, recording medium attachment part 18, REC/PAUSE button 21, menu button 22, menu operation lever 23, and battery lid 24.

The camera main unit 10 has a right side surface provided with vent holes 25, 26 and detachably mounted with a grip unit 12, and has a left side surface provided with a vent hole 27 and a power switch 28.

On an upper surface of the camera main unit 10, there is provided an accessory shoe 14 that can be mounted with a handle 30 shown in FIGS. 3A and 3B or can be mounted with an image display device (hereinafter, referred to as the display device) 40 shown in FIG. 4. The accessory shoe 14 is formed with a threaded hole 15 for engagement with a screw (not shown) by which the handle 30 mounted to the accessory shoe 14 is fixed to the camera main unit 10. On a front surface of the camera main unit 10, there is provided a mounting part 19 that can be mounted with a lens unit 70 (see FIG. 7).

Figure 3A:
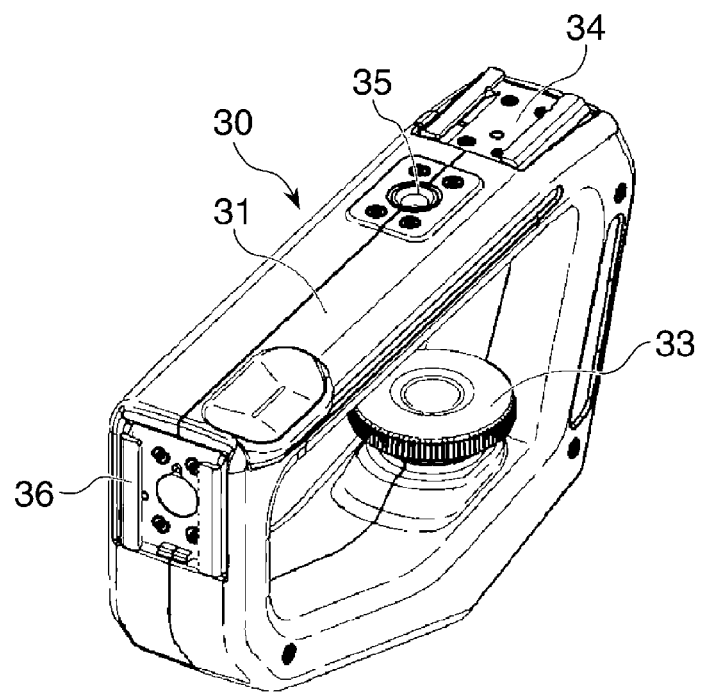
FIG. 3A is an upper perspective view of a handle that can be mounted to the camera main unit.
Figure 3B:
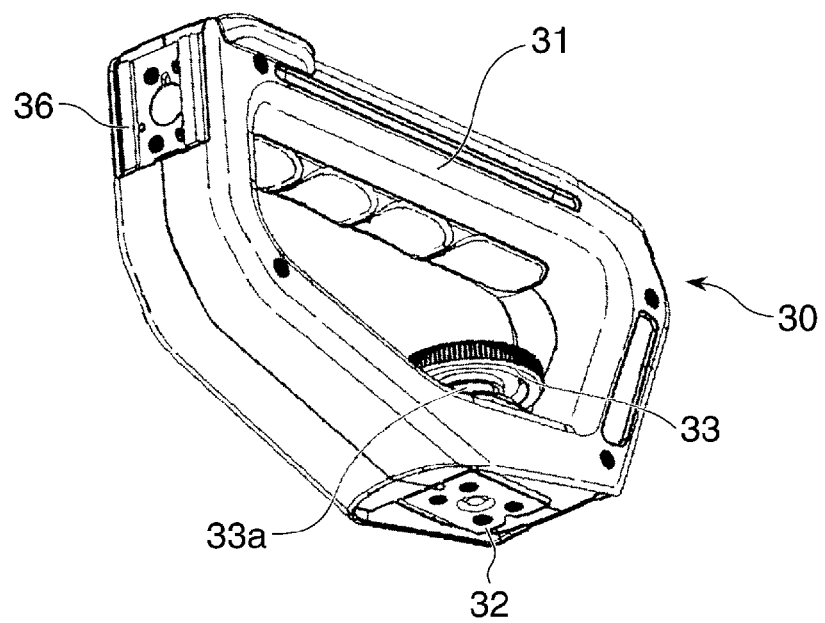
FIG. 3B is a lower perspective view of the handle.

FIGS. 3A and 3B show the handle 30 in upper perspective view and in lower perspective view, respectively.

As shown in FIGS. 3A and 3B, the handle 30 has a grasped part 31 configured to be grasped by a photographer/user. On an upper face of the handle 30, there is provided an accessory shoe 34 configured to be mounted with a video light or the like, and there is formed a threaded hole 35 for use when the video light or the like mounted to the accessory shoe 34 is screw-fastened to the handle 30. On a front face of the handle 30, an accessory shoe 36 is provided that can be mounted with the display device 40. On a bottom face of the handle 30, a mounting part 32 is provided that is configured to be mounted to the accessory shoe 14 of the camera main unit 10. The handle 30 has a rotary operation part 33 that is disposed in alignment with the mounting part 32. When the rotary operation part 33 is rotatively operated in a state that the mounting part 32 is placed on the accessory shoe 14 of the camera main unit 10, threads 33a of the rotary operation part 33 are engaged in the threaded hole 15 of the camera main unit 10, whereby the handle 30 is fixed to the camera main unit 10.

Figure 4:
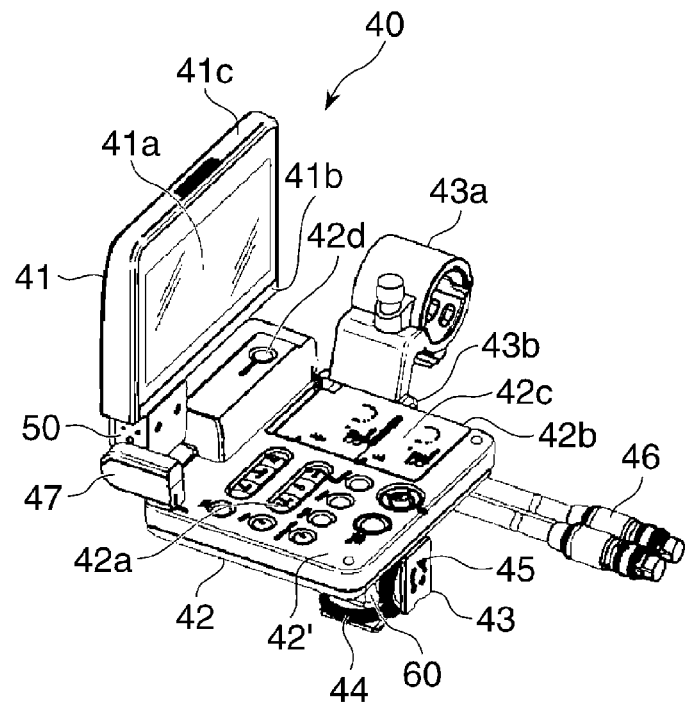
FIG. 4 is a perspective view of a display device provided with a mounting unit having first and second mount mechanisms, which can be mounted to the camera main unit and to the handle, respectively.

FIG. 4 shows the display device 40 in perspective view. As shown in FIG. 4, the display device 40 includes an image display unit 41, an operation unit 42 for operating the camera main unit 10 and the display device 40, and a mounting unit 43 configured to be mounted to the accessory shoe 14 of the camera main unit 10 or to the accessory shoe 36 of the handle 30. The display device 40 further includes signal cables 46 and a container unit 47.

The image display unit 41 is mounted to the operation unit 42 through a double-axis hinge mechanism (denoted by reference numeral 50 in e.g. FIG. 9A and described in detail later) so as to be rotatable relative to the operation unit 42. The operation unit 42 is mounted to the mounting unit 43 through a rotary mechanism (denoted by reference numeral 60 in e.g. FIGS. 14A and 14B and described in detail later) so as to be rotatable relative to the mounting unit 43 about a third rotation axis, which is denoted by reference numeral 103 in e.g. FIGS. 14A, 14B, and 25.

The image display unit 41 has an image display panel 41a that displays an image photographed through the camera main unit 10 and displays information representing a setting state or an operation state of the camera main unit 10. The display unit 41 further includes a protection member 41b that protects the image display panel 41a. An exterior of the image display unit 41 is covered by a cover member 41c made of a soft resin material or the like.

Figure 24:
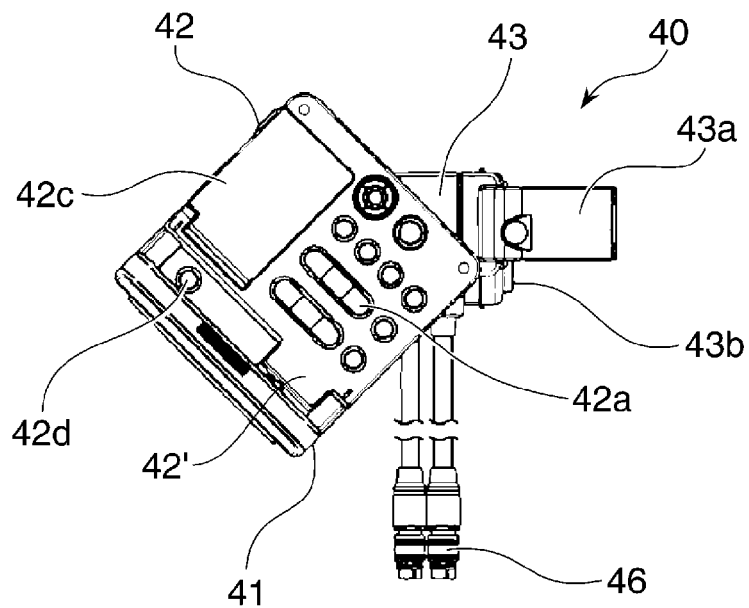
FIG. 24 is a view showing, as seen from above, a state of the display device obtained by rotating the operation unit by 135 degrees anticlockwise relative to the mounting unit about the third rotation axis from the state of FIG. 7 or 8.
Figure 25:
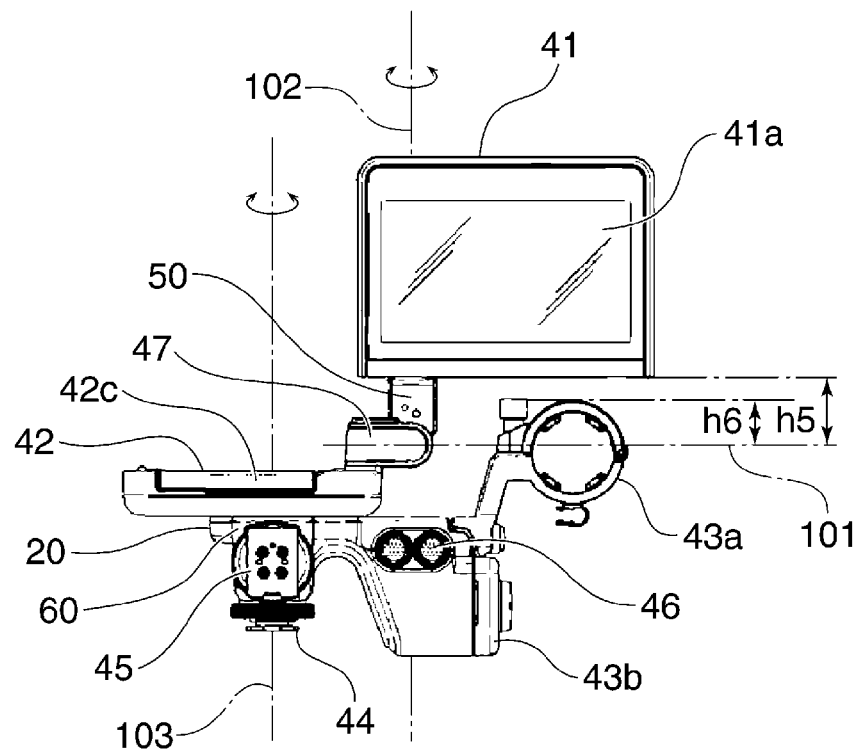
FIG. 25 is a view showing a state where the image display unit has been rotated by 90 degrees about the second rotation axis from the state of FIG. 18 obtained by opening the image display unit by 90 degrees about the first rotation axis and the operation unit has been rotated by 90 degrees relative to the mounting unit about the third rotation axis.

The operation unit 42 has a group of operation buttons 42a that are operable to cause the camera main unit 10 to execute a predetermined operation, a signal level adjustment unit 42b (see FIG. 26) that adjusts, e.g., the level of a voice signal supplied from an external microphone (not shown) connected to the display device 40, a cover member 42c that covers the signal level adjustment unit 42b, and a display direction change button 42d operable to change the display direction of an image displayed on the image display unit 41. Reference numeral 42' denotes an operation face on which the operation button group 42a is disposed. As shown in FIGS. 24 and 25, the operation face 42' of the operation unit 42 extends perpendicular to the third rotation axis 103 of the operation unit 42.

The mounting unit 43 has an external microphone holder 43a that holds the external microphone, a connector 43b to which a connector of the external microphone can be connected, a first mount mechanism 44 configured to be mounted to the accessory shoe 14 of the camera main unit 10, and a second mount mechanism 45 configured to be mounted to the accessory shoe 36 of the handle 30.

The display device 40 receives, from the camera main unit 10 via the signal cables 46, an image signal obtained by the camera main unit 10. The display device 40 transmits, to the camera main unit 10 via the signal cables 46, a control signal corresponding to an operation on the operation button group 42a and a voice signal obtained by the external microphone. It should be noted that the control signal and the voice signal are each transmitted from the display device 40 to the camera main unit 10 after being subjected to level adjustment by the signal level adjustment unit 42b of the operation unit 42.

Figure 5:
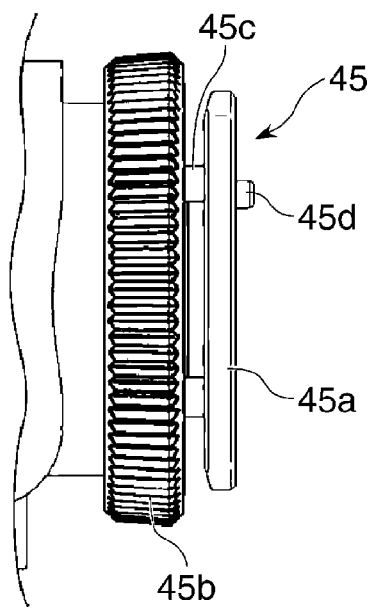
FIG. 5 is a fragmentary enlarged side view showing the second mount mechanism of the mounting unit of the display device.

FIG. 5 shows in fragmentary enlarged side view the second mount mechanism 45, which is provided in the mounting unit 43 of the display device 40 and through which the image display unit 41 is rotatably mounted to the operation unit 42. As shown in FIG. 5, the second mount mechanism 45 has a fitment part 45a configured to be fitted into the accessory shoe 36 of the handle 30, a restriction member 45b, a guide member 45c, and a detachment prevention pin 45d.

Figure 6A:
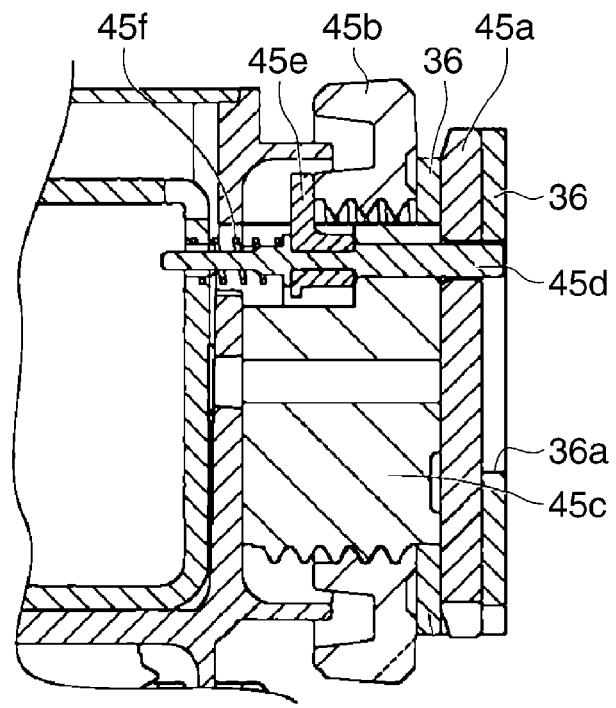
FIG. 6A is a fragmentary enlarged section view showing a state where a detachment prevention pin of the second mount mechanism projects into a central hole of an accessory shoe of the handle.
Figure 6B:
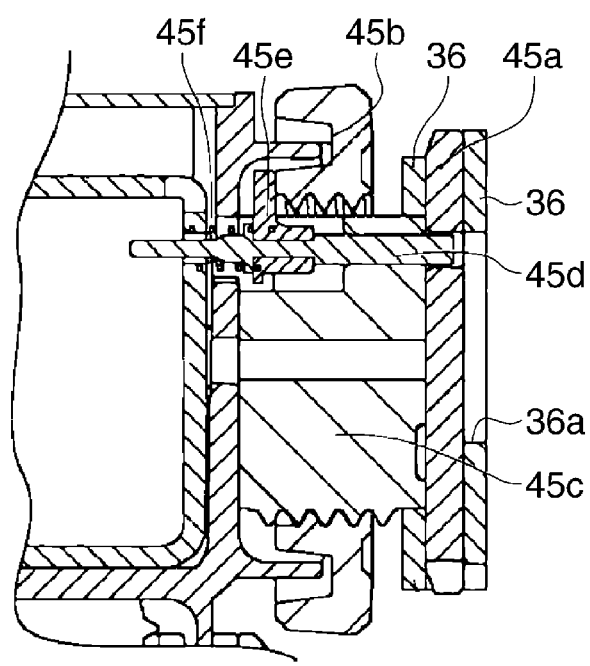
FIG. 6B is a fragmentary enlarged section view showing a state where the detachment prevention pin of the second mount mechanism does not project into the central hole of the accessory shoe of the handle.

FIGS. 6A and 6B respectively show in fragmentary enlarged section view a state where the detachment prevention pin 45d of the second mount mechanism 45 projects into a central hole 36a formed in the accessory shoe 36 of the handle 30 and a state where the detachment prevention pin 45d does not project into the central hole 36a.

In FIGS. 6A and 6B, reference numerals 45e, 45f respectively denote an abutment member and an elastic member of the second mount mechanism 45. The abutment member 45e is made of resin or the like and disposed in contact with the restriction member 45b. The elastic member 45f is constituted by a coil spring or the like.

The fitment part 45a of the second mount mechanism 45 is fitted into the accessory shoe 36 of the handle 30, whereby the display device 40 is mounted to the handle 30.

The restriction member 45b is formed into a ring shape and has an inner peripheral surface thereof formed with a threaded hole for engagement with threads formed on an outer peripheral surface of the guide member 45c. When rotated, the restriction member 45b moves along the guide member 45c between a position where the restriction member 45b prevents the display device 40 from moving relative to the handle 30 and a position where it allows the display device 40 to be detached from the handle 30.

The detachment prevention pin 45d is formed integrally with the abutment member 45e and urged by an urging force of the elastic member 45f toward the central hole 36a formed in the accessory shoe 36 of the handle 30. An amount of projection of a tip end portion of the detachment prevention pin 45d into the central hole 36a changes according to the moving position of the restriction member 45b along the guide member 45c.

In a state shown in FIG. 6A, the restriction member 45b is in abutment with the accessory shoe 36 of the handle 30. Accordingly, by the urging force of the elastic member 45f, the tip end portion of the detachment prevention pin 45d passes through a pin insertion hole formed in the fitment part 45a and projects into the central hole 36a of the accessory shoe 36 of the handle 30. As a result, when an attempt is made to detach the display device 40 from the handle 30, the tip end portion of the detachment prevention pin 45d is brought in contact with the inner peripheral surface of the accessory shoe 36 to prevent the display device 40 from moving relative to the handle 30, whereby the display device 40 is prevented from being detached from the handle 30.

On the other hand, in a state shown in FIG. 6B, the restriction member 45b stays away from the accessory shoe 36 of the handle 30, and the tip end portion of the detachment prevention pin 45d is inside the pin insertion hole of the fitment part 45a of the second mount mechanism 45. In other words, the tip end portion of the detachment prevention pin 45d does not project into the central hole 36a of the accessory shoe 36 of the handle 30, whereby the display device 40 is allowed to be detached from the handle 30.

It should be noted that the first mount mechanism 44 via which the display device 40 is coupled to the accessory shoe 14 of the camera main unit 10 is the same in construction as the second mount mechanism 45, and therefore a description thereof will be omitted herein.

Figure 7:
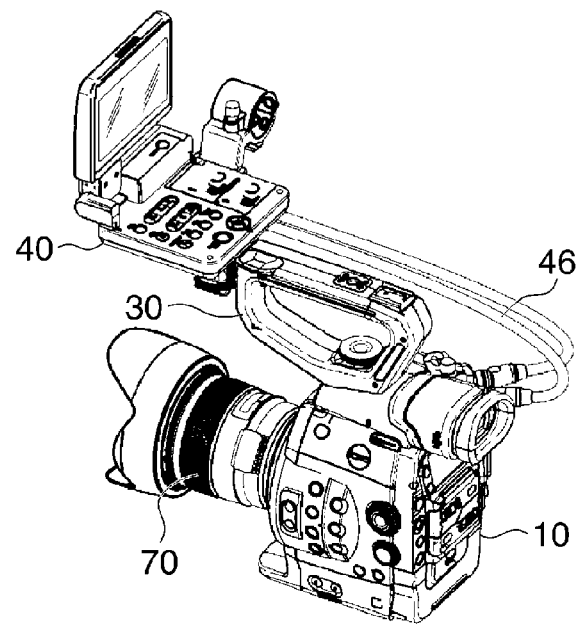
FIG. 7 is a perspective view showing a state where the display device is fixed to the camera main unit through the handle.
Figure 8:
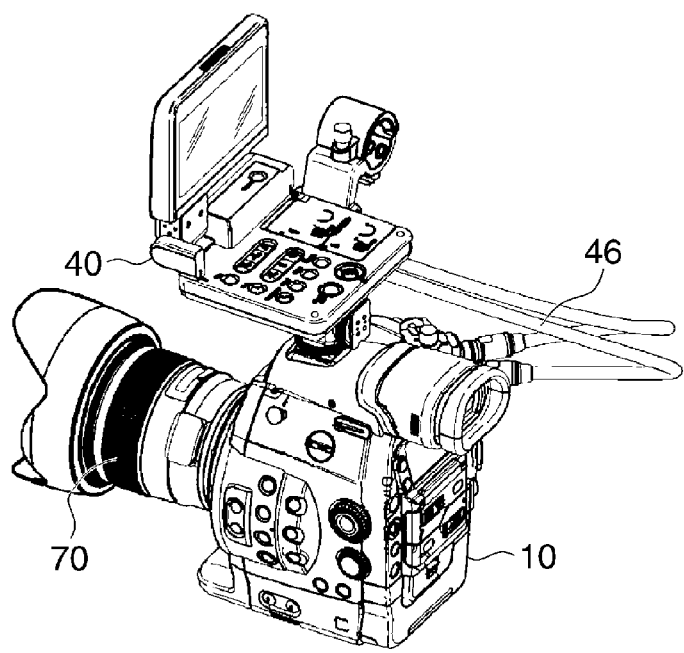
FIG. 8 is a perspective view showing a state where the display device is fixed to the camera main unit without the intervention of the handle.

FIG. 7 shows in perspective view a state where the handle 30 fixed with the display device 40 is fixed to the camera main unit 10, and FIG. 8 shows in perspective view a state where the display device 40 is fixed to the camera main unit 10 without the intervention of the handle 30. In FIGS. 7 and 8, reference numeral 70 denotes a lens unit mounted to the camera main unit 10.

Next, with reference to FIGS. 9 to 13, a description will be given of the double-axis hinge mechanism 50 through which the image display unit 41 is coupled to the operation unit 42 for rotation relative to the operation unit 42.

Figure 9A:
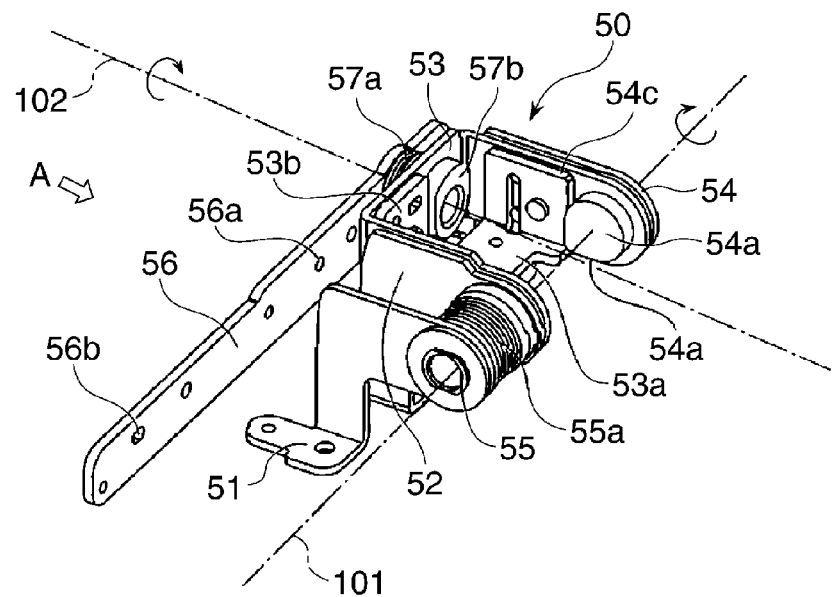
FIG. 9A is a perspective view of a hinge mechanism, which couples an image display unit of the display device to an operation unit of the display device, at the time when the image display unit is closed relative to the operation unit.
Figure 9B:
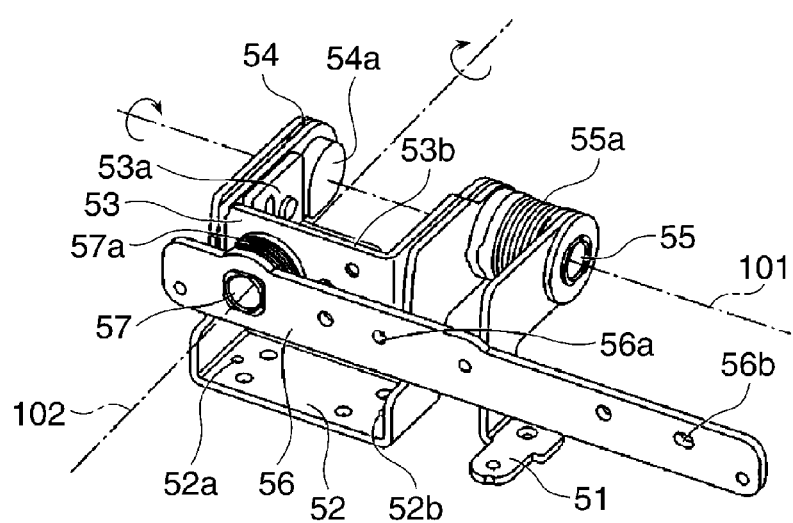
FIG. 9B is a perspective view of the hinge mechanism as seen from a direction of arrow A shown in FIG. 9A.

FIG. 9A shows in perspective view the double-axis hinge mechanism 50 at the time when the image display unit 41 is closed relative to the operation unit 42, and FIG. 9B shows in perspective view the hinge mechanism 50 as seen from a direction of arrow A shown in FIG. 9A.

As shown in FIGS. 9A and 9B, the double-axis hinge mechanism 50 has a first fixture part 51, second fixture part 52, rotary part 53, first calking part 54, second calking part 55, fastening part 56, and third calking part 57.

The first fixture part 51 is fixed to the operation unit 42 by means of screws that are threadedly engaged in threaded holes formed in the fixture part 51. After being positioned relative to the operation unit 42 by means of positioning bosses (not shown) formed in the operation unit 42 and fitted into positioning holes 52a, 52b of the second fixture part 52, the second fixture part 52 is fixed to the operation unit 42 by means of screws that are threadedly engaged in threaded holes formed in the fixture part 52.

The rotary part 53 is coupled to the second fixture part 52 by the first calking part 54 for rotation relative thereto, and also coupled to the first and second fixture parts 51, 52 by the second calking part 55 for rotation relative thereto. Thus, the rotary part 53 can be rotated relative to the first and second fixture parts 51, 52. The rotary part 53 has first and second stopper members 53a, 53b, which will be described in detail later.

Figure 10:
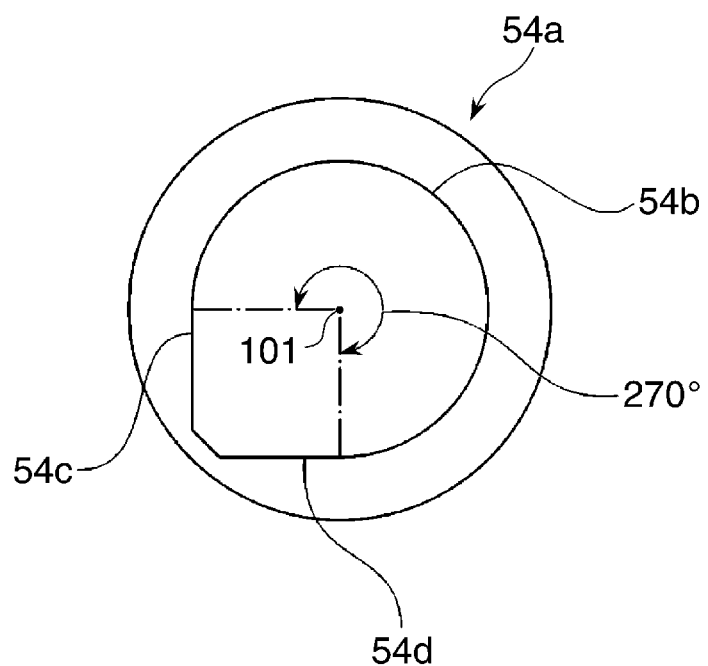
FIG. 10 is a front view showing a rotation-preventing portion of a first calking part of the hinge mechanism.
Figure 11A:
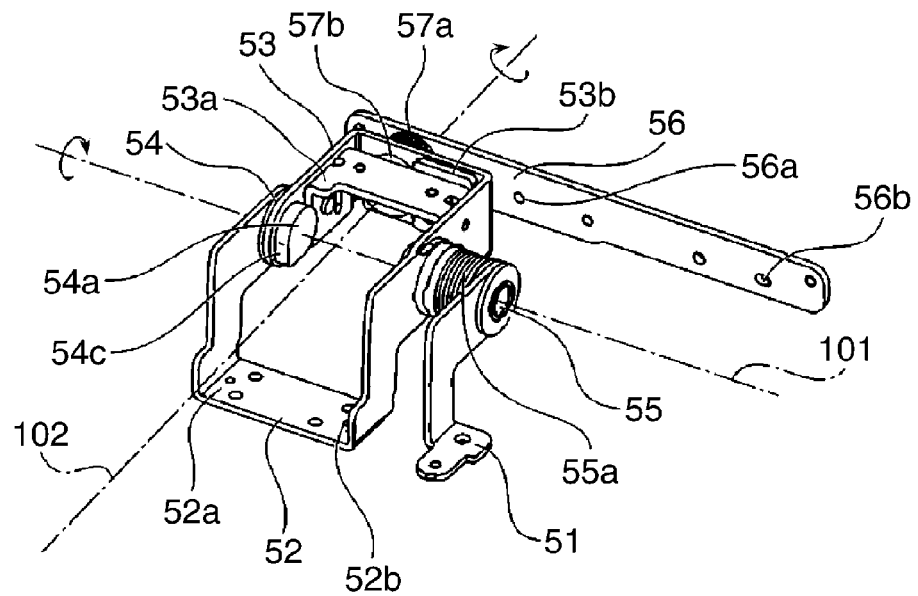
FIG. 11A is a perspective view showing a state of the hinge mechanism obtained by rotating the image display unit by 180 degrees about a first rotation axis relative to the operation unit from the state of FIGS. 9A and 9B where the image display unit is closed relative to the operation unit.
Figure 11B:
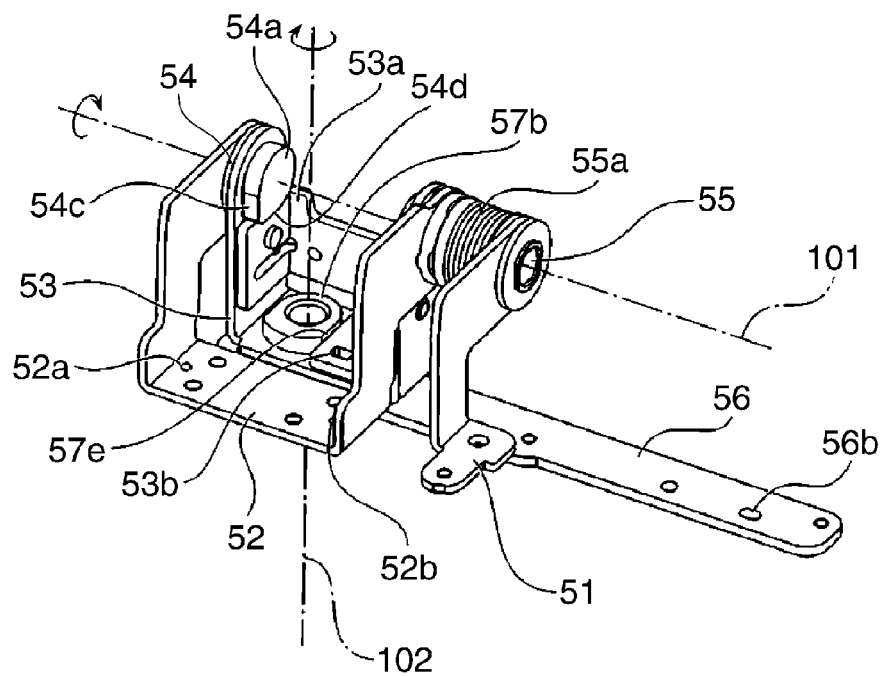
FIG. 11B is a perspective view showing a state of the hinge mechanism obtained by rotating the image display unit by 270 degrees about the first rotation axis relative to the operation unit from the state of FIGS. 9A and 9B.

FIG. 10 shows in front view a rotation-preventing portion of the first calking part 54 as seen from the direction of a first rotation axis 101. FIGS. 11A and 11B show, in perspective view, states of the double-axis hinge mechanism 50 (see FIGS. 19 and 20) respectively obtained by rotating the image display unit 41 by 180 degrees and by 270 degrees about the first rotation axis 101 relative to the operation unit 42 from the state of FIGS. 9A, 9B and 17 where the image display unit 41 is closed relative to the operation unit 42.

In the double-axis hinge mechanism 50, the first calking part 54 is disposed between the second fixture part 52 and the rotary part 53 and couples these parts 52, 53 to each other, as previously described. As shown in FIG. 10, the rotation-preventing portion 54a of the first calking part 54 (hereinafter, referred to as the first rotation-preventing portion 54a) has a circular section 54b and planar sections 54c, 54d. These sections 54b to 54d are disposed for contact with the first stopper member 53a of the rotary part 53. The first calking part 54 is capable of rotating about the first rotation axis 101 while the circular section 54b of the first rotation-preventing portion 54a is in abutment with the stopper member 53a, but becomes incapable of rotating when the planar section 54c or 54d is brought in face-contact with the first stopper member 53a. In other words, the first rotation-preventing portion 54a cooperates with the first stopper member 53a to prevent the image display unit 41 (which is rotatably coupled to the operation unit 42 through the hinge mechanism 50) from excessively rotating about the first rotation axis 101.

Referring to FIGS. 9A and 9B again, the second calking part 55 has a disc spring 55a for generating a holding torque to hold the orientation of the image display unit 41, and is capable of holding the orientation of the image display unit 41 at an arbitrary angle within a rotatable angle range of the image display unit 41 about the first rotation axis 101.

The fastening part 56 has positioning holes 56a, 56b and threaded holes, and is positioned relative to the image display unit 41 and coupled thereto by means of screws. The fastening part 56 is also coupled to the rotary part 53 through the third calking part 57 and rotatable about a second rotation axis 102. Accordingly, the image display unit 41 can be rotated relative to the operation unit 42 about the second rotation axis 102.

The third calking part 57 has a disc spring 57a and a rotation-preventing portion 57b (hereinafter, referred to as the second rotation-preventing portion 57b). The disc spring 57a generates a holding torque that holds the orientation of the image display unit 41, whereby the orientation of the image display unit 41 (which is rotatable about the second rotation axis 102) can be held at an arbitrary angle.

In the state of FIGS. 9A and 9B where the image display unit 41 is closed relative to the operation unit 42, the first stopper member 53a of the rotary part 53 and the planar section 54c of the rotation-preventing portion 54a of the first calking part 54 (first rotation-preventing portion 54a) are in contact with each other in the hinge mechanism 50, whereby the image display unit 41 is prevented from rotating relative to the operation unit 42.

As shown in FIG. 11A, when the image display unit 41 is rotated by 180 degrees relative to the operation unit 42 from the state of FIGS. 9A and 9B, the first rotation-preventing portion 54a is brought in contact at the circular section 54b with the first stopper member 53a, thereby allowing the image display unit 41 to further rotate relative to the operation unit 42.

As shown in FIG. 11B, when the image display unit 41 is rotated by 270 degrees relative to the operation unit 42 from the state of FIGS. 9A and 9B, the planar section 54d of the first rotation-preventing portion 54a is brought in contact with the first stopper member 53a, whereby the image display unit 41 is prevented from rotating further relative to the operation unit 42 (see FIG. 10). In other words, the rotatable angle range of the image display unit 41 about the first rotation axis 101 is from 0 degree to 270 degree in this embodiment.

Figure 12:
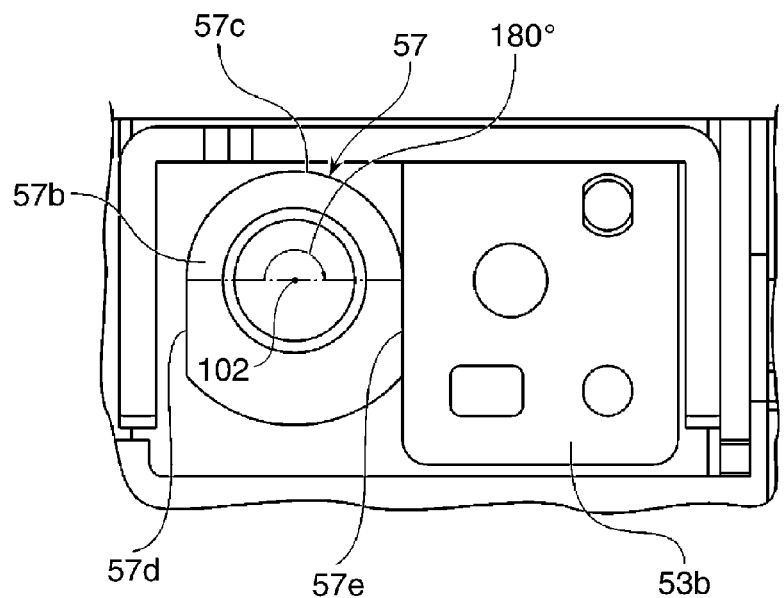
FIG. 12 is a front view showing, as seen from the direction of a second rotation axis, a rotation-preventing portion of a third calking part of the hinge mechanism that is in the state of the FIG. 11B.

FIG. 12 shows in front view the second rotation-preventing portion 57b of the third calking part 57 of the hinge mechanism 50 (which is in the state of FIG. 11B) as seen from the direction of the second rotation axis 102.

As previously described, the third calking part 57 is disposed between the rotary part 53 and the fastening part 56 and couples these parts 53, 56 to each other. The second rotation-preventing portion 57b has a circular section 57c and planar sections 57d, 57e. These sections 57c to 57e are disposed for contact with the second stopper member 53b of the rotary part 53. The third calking part 57 is capable of rotating about the second rotation axis 102 while the circular section 57c of the second rotation-preventing portion 57b is in abutment with the second stopper member 53b, but becomes incapable of rotating when the planar section 57d or 57e is brought in face-contact with the second stopper member 53b. As shown in FIG. 12, the third calking part 57 is capable of rotating clockwise by 180 degrees about the second rotation axis 102. The second rotation-preventing portion 57b cooperates with the second stopper member 53b to prevent the image display unit 41 from rotating about the second rotation axis 102.

Figure 13:
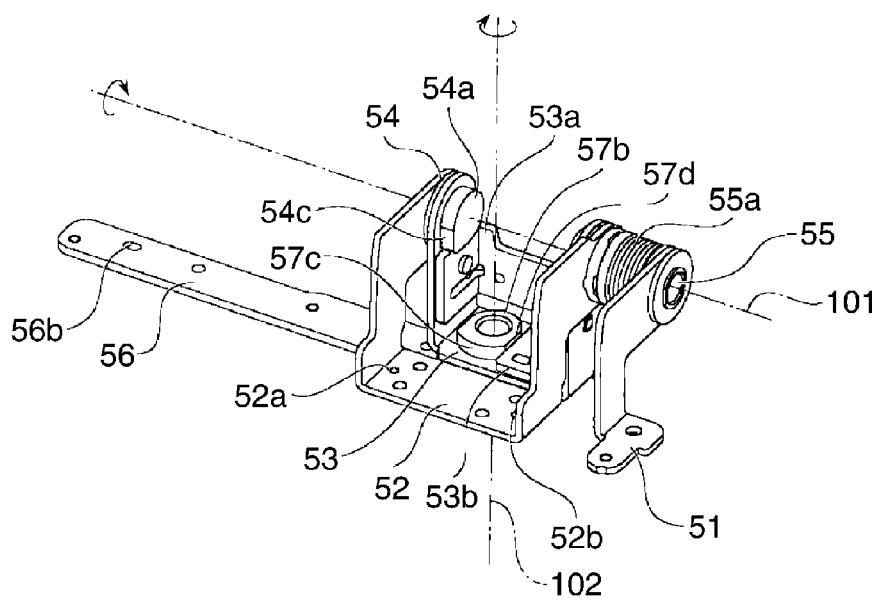
FIG. 13 is a perspective view of the hinge mechanism at the time when the image display unit is rotated by 180 degrees about the second rotation axis relative to the operation unit from the state of FIG. 11B.

FIG. 13 shows in perspective view the double-axis hinge mechanism 50 observed when the image display unit 41 is rotated by 180 degrees about the second rotation axis 102 relative to the operation unit 42 from the state of FIG. 11B, which is obtained by rotating the display unit 41 by 270 degrees about the first rotation axis 101 from the closed state of the display unit 41. In the state of FIG. 13, the planar section 57d of the second rotation-preventing portion 57b is in abutment with the second stopper member 53b, whereby the image display unit 41 is prevented from rotating further relative to the operation unit 42.

Next, with reference to FIGS. 14 to 16, a description will be given of the rotary mechanism 60 through which the operation unit 42 is coupled to the mounting unit 43 for rotation relative thereto.

Figure 14A:
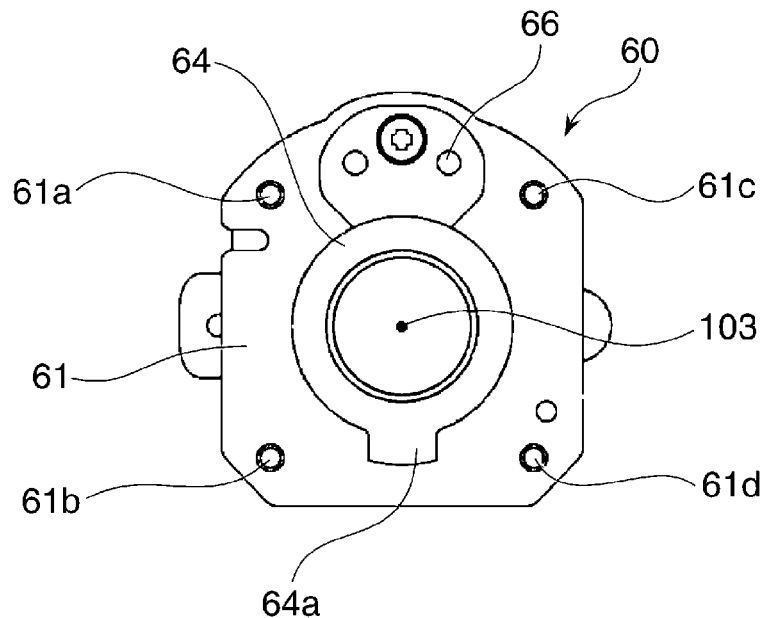
FIG. 14A is a view showing, as seen from the direction of a third rotation axis, a rotary mechanism that couples the operation unit of the display device to the mounting unit of the display device.
Figure 14B:
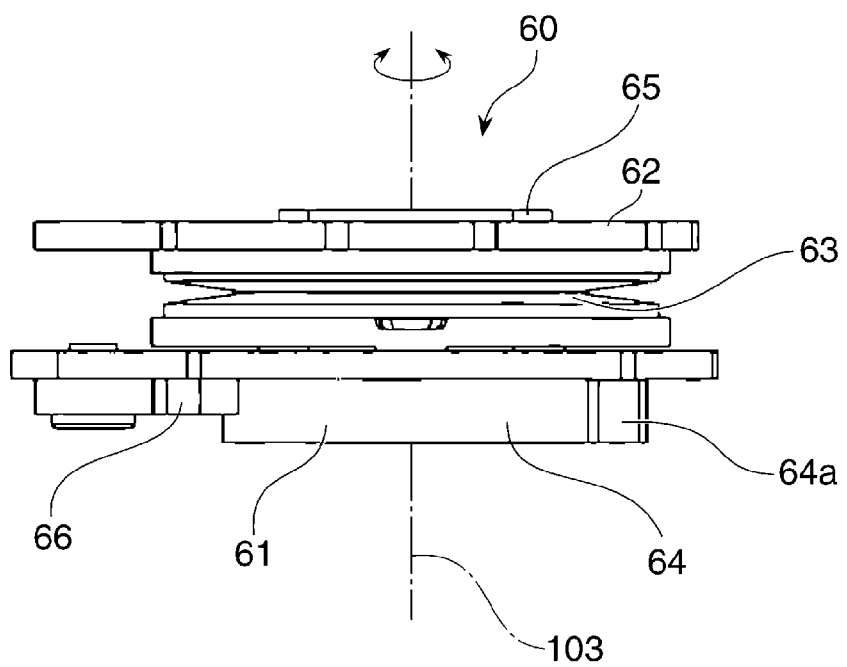
FIG. 14B is a side view of the rotary mechanism.
Figure 15:
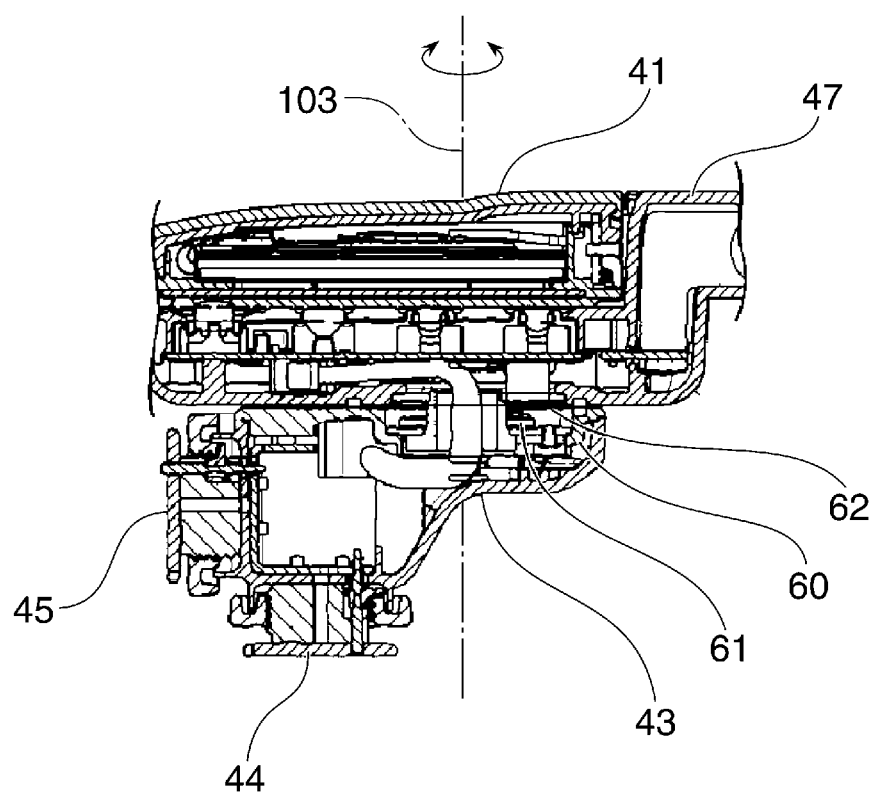
FIG. 15 is a fragmentary section view of the display device taken along the third rotation axis.

FIG. 14A shows the rotary mechanism 60 as seen from the direction of the third rotation axis 103, and FIG. 14B shows the rotary mechanism 60 in side view. FIG. 15 shows the display device 40 in fragmentary section view taken along the third rotation axis 103.

As shown in FIGS. 14A and 14B, the rotary mechanism 60 has a first mounting member 61, second mounting member 62, disc spring 63, rotary shaft member 64, calking part 65, and rotation-preventing part 66.

The first mounting member 61 has fastening parts 61a to 61d that are coupled to the mounting unit 43 of the display device 40, and the second mounting member 62 has fastening parts (not shown) that are coupled to the operation unit 42, whereby the display device 40 is coupled to the operation unit 42.

The disc spring 63 is disposed between the first and second mounting members 61, 62 and generates a holding torque to hold the operation unit 42 at an arbitrary angle within a rotatable angle range of the operation unit 42, which can be rotated relative to the mounting unit 43 about the third rotation axis 103 perpendicular to the operation face 42' of the operation unit 42 of the display device 40 (see FIGS. 24 and 25). The rotary shaft member 64 has a protrusion 64a. When the rotary mechanism 60 is in a state shown in FIG. 14A, the protrusion 64a is spaced away from the rotation-preventing part 66, so that the operation unit 42 can be rotated about the third rotation axis 103.

Figure 16A:
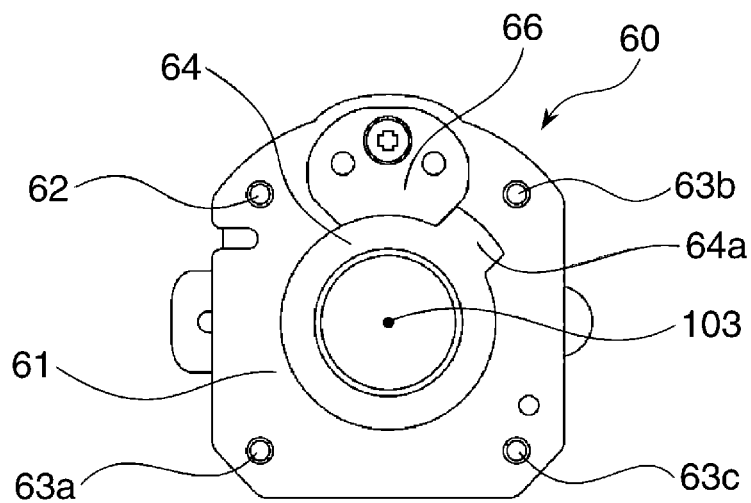
FIG. 16A is a view showing, as seen from the direction of a third rotation axis, a state of the rotary mechanism obtained by rotating the operation unit by 135 degrees clockwise about the third rotation axis from the state of FIG. 14A where the operation unit can be rotated.
Figure 16B:
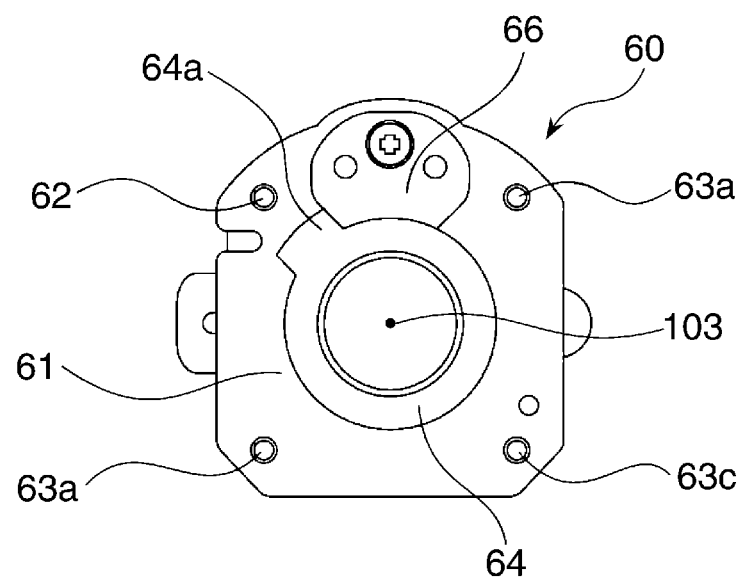
FIG. 16B is a view showing, as seen from the direction of the third rotation axis, a state of the rotary mechanism obtained by rotating the operation unit by 135 degrees anticlockwise about the third rotation axis from the state of FIG. 14A.

FIGS. 16A and 16B show, as seen from the direction of the third rotation axis 103, states of the rotary mechanism 60 respectively obtained by rotating the operation unit 42 by 135 degrees clockwise and by 135 degrees anticlockwise about the third rotation axis 103 from the state of FIG. 14A.

As shown in FIGS. 16A and 16B, the protrusion 64a of the rotary shaft member 64 is brought in contact with the rotation-preventing part 66 when the operation unit 42 is rotated by 135 degrees clockwise or anticlockwise relative to the mounting unit 43 from the state of FIG. 14A, whereby the operation unit 42 is prevented from rotating further.

Next, with reference to FIGS. 17 to 20, a description will be given of an example operation where the image display unit 41 is rotated relative to the operation unit 42 about the first rotation axis 101.

Figure 17:
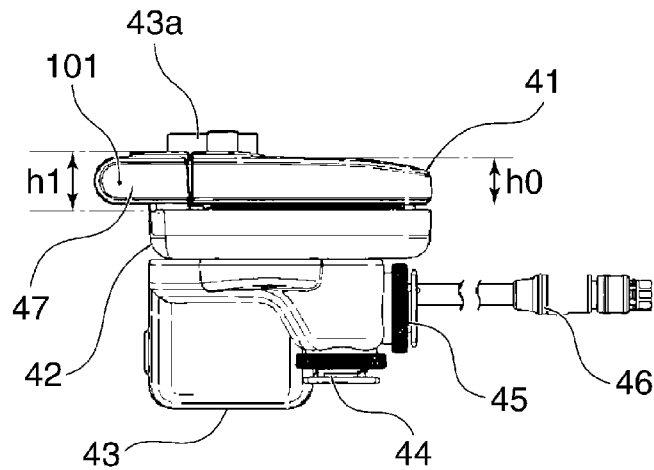
FIG. 17 is a view showing a state of the display device where the image display unit is closed relative to the operation unit.

FIG. 17 shows the display device 40 in a state where the image display unit 41 is closed relative to the operation unit 42. As shown in FIG. 17, a container unit 47 is formed to project upwardly from the operation unit 42. In the state of FIG. 17 where the image display unit 41 is closed, the double-axis hinge mechanism 50 is housed in the container unit 47.

An amount of upward projection (height) h1 of the container unit 47 from the operation unit 42 is made nearly equal to a thickness h0 of the image display unit 41 such that the container unit 47 does not excessively project from the operation unit 42 in the height direction when the image display unit 41 is closed relative to the operation unit 42.

An amount of forward projection h2 of the container unit 47 from the operation unit 42 (see FIG. 20) is made nearly equal to the thickness h0 of the image display unit 41 such that the image display unit 41 is not brought in contact with the operation unit 42 when rotated by 270 degrees in the opening direction from the closed state of FIG. 17.

Figure 18:
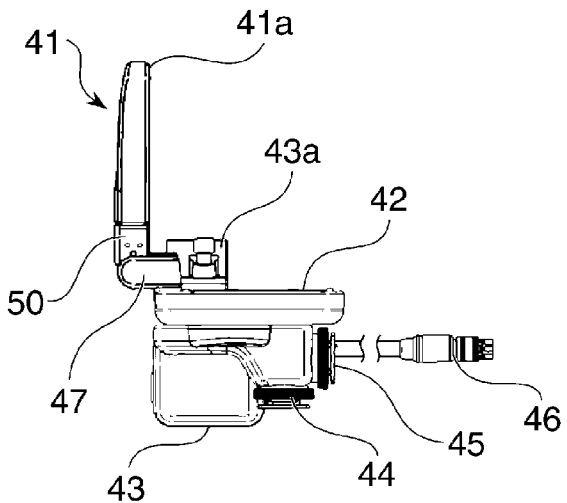
FIG. 18 is a view showing a state of the display device obtained by rotating the image display unit in the opening direction by 90 degrees about the first rotation axis relative to the operation unit from the closed state of FIG. 17.
Figure 19:
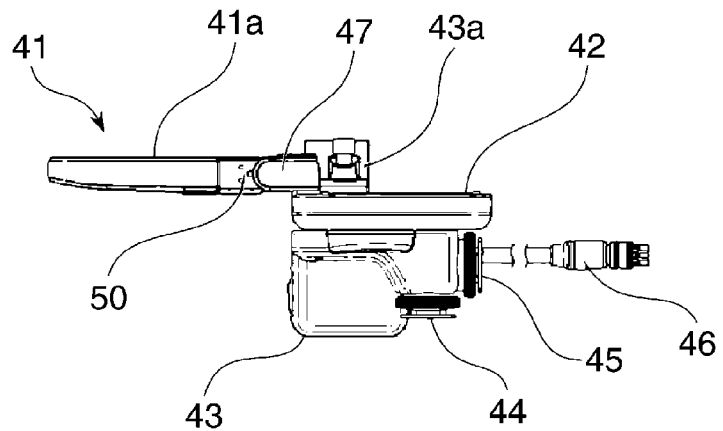
FIG. 19 is a view showing a state of the display device obtained by rotating the image display unit in the opening direction by 180 degrees about the first rotation axis relative to the operation unit from the closed state of FIG. 17.
Figure 20:
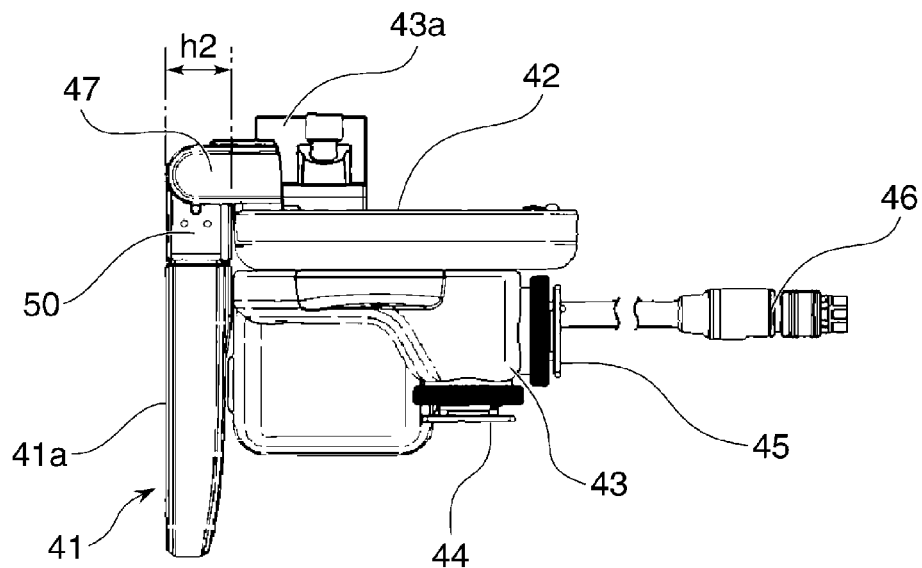
FIG. 20 is a view showing a state of the display device obtained by rotating the image display unit by 270 degrees in the opening direction relative to the operation unit about the first rotation axis from the closed state of FIG. 17.

FIGS. 18 to 20 show states of the display device 40 respectively obtained by rotating the image display unit 41 relative to the operation unit 42 about the first rotation axis 101 in the opening direction by 90 degrees, by 180 degrees, and by 270 degrees from the closed state of FIG. 17.

By the holding force generated by the disc spring 55a of the hinge mechanism 50, the image display unit 41 can be held at an arbitrary angle within the range from the closed state of FIG. 17 to the state of FIG. 20 where the image display unit 41 is opened by 270 degrees.

Next, with reference to FIGS. 21 and 22, a description will be given of an example operation where the image display unit 41 is rotated relative to the operation unit 42 about the second rotation axis 102.

Figure 21:
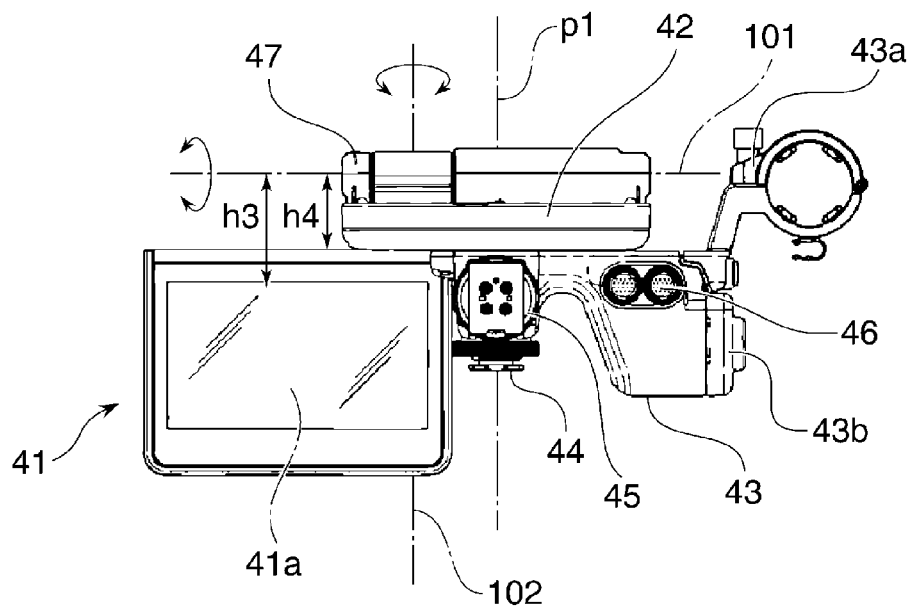
FIG. 21 is a view showing a state of the display device obtained by rotating the image display unit by 180 degrees relative to the operation unit about the second rotation axis from the state of FIG. 20 where the image display unit is opened by 270 degrees about the first rotation axis.

FIG. 21 shows a state of the display device 40 obtained by rotating the image display unit 41 by 180 degrees relative to the operation unit 42 about the second rotation axis 102 from the state of FIG. 20 where the image display unit 41 is opened by 270 degrees about the first rotation axis 101.

In the state shown in FIG. 21, the second rotation axis 102 is on a side opposite from the external microphone holder 43a with respect to a widthwise center line p1 of the operation unit 42. In other words, the image display unit 41 is on the side opposite from the microphone holder 43a with respect to the widthwise center line p1.

As shown in FIG. 21, a distance h3 from the first rotation axis 101 to an end of the image display panel 41a of the image display unit 41 on the side close to the double-axis hinge mechanism 50 is made larger than a distance h4 from the first rotation axis 101 to a bottom face of the operation unit 42, so that an image displayed on the image display panel 41a is not intercepted by the operation unit 42.

It should be noted that an image displayed on the image display panel 41a is a vertically inverted image of a photographed image. The inverted image is converted into an erect image in response to the display direction change button 42d of the operation unit 42 being operated.

Figure 22:
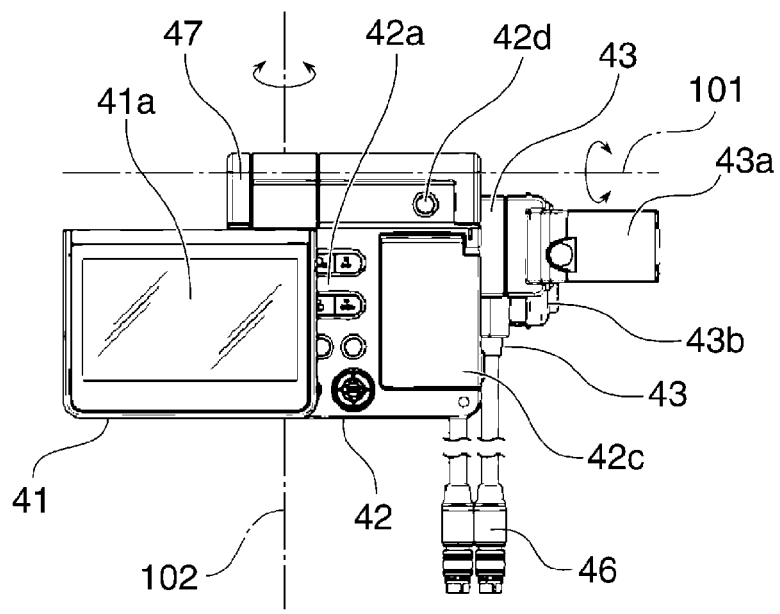
FIG. 22 is a view showing a state of the display device obtained by rotating the image display unit by 90 degree about the first rotation axis in a direction to cause its image display screen to face upward after the image display unit is rotated by 180 degrees about the second rotation axis from the state of FIG. 18 obtained by rotating the image display unit by 90 degrees about the first rotation axis.

FIG. 22 shows a state of the display device 40 obtained by rotating the image display unit 41 by 90 degrees about the first rotation axis 101 in a direction to cause the image display screen of the image display panel 41a to face upward after the image display unit 41 is rotated by 180 degrees about the second rotation axis 102 from the state of FIG. 18 obtained by rotating the image display unit 41 by 90 degrees about the first rotation axis 101. As shown in FIG. 22, the image display unit 41 can be disposed upward of the operation unit 42 such that the image display screen of the display unit 41 can be viewed by the photographer/user from above.

In the state shown in FIG. 22, the second rotation axis 102 is on the left side of the widthwise center line p1 of the operation unit 42, and the image display unit 41 is disposed in a region avoiding the signal level adjustment unit 42b (which is covered by the cover member 42c in FIG. 22). Accordingly, the photographer/user can operate the signal level adjustment unit 42b, while confirming an image displayed on the image display panel 41a.

By rotating the image display unit 41 about the first and second rotation axes 101, 102 as described above, the image display unit 41 can be adjusted to an arbitrary angle such that the image display screen of the unit 41 can assume an arbitrary orientation such as one where the display screen faces the photographer/user or faces the object.

Next, with reference to FIGS. 23 and 24, a description will be given of an example operation where the operation unit 42 is rotated relative to the mounting unit 43 about the third rotation axis 103.

Figure 23:
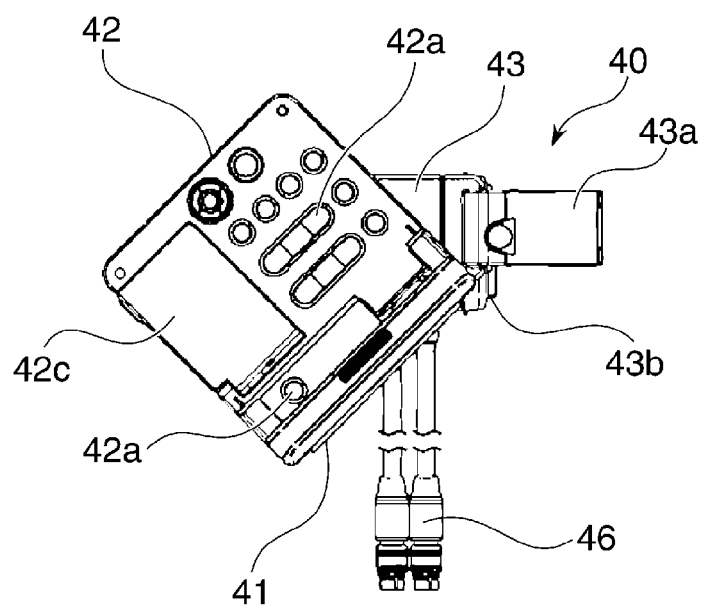
FIG. 23 is a view showing, as seen from above, a state of the display device obtained by rotating the operation unit by 135 degrees clockwise relative to the mounting unit of the display device about the third rotation axis from the state of FIG. 7 or 8 where the display device is fixed to the camera main unit.

FIGS. 23 and 24 show, as seen from above, states of the display device 40 respectively obtained by rotating the operation unit 42 by 135 degrees clockwise and by 135 degrees anticlockwise relative to the mounting unit 43 of the display device 40 about the third rotation axis 103 from the state of FIG. 7 or 8 where the display device 40 is fixed to the camera main unit 10.

As shown by way of example in FIGS. 23 and 24, the photographer/user can operate the operation unit 42 while facing the operation unit 42 that has been adjusted to assume an arbitrary angle within a range from an angle of 135 degrees clockwise to an angle of 135 degrees anticlockwise about the third rotation axis 103. It should be noted that the rotation angle limit of the operation unit 42 is not limited to 135 degrees, and can be any other angle where photographing is not hindered.

FIG. 25 shows a state where the image display unit 41 has been rotated by 90 degrees about the second rotation axis 102 from the state of FIG. 18 obtained by opening the image display unit 41 by 90 degrees about the first rotation axis 101 and the operation unit 42 has been rotated by 90 degrees relative to the mounting unit 43 about the third rotation axis 103.

As shown in FIG. 25, a distance h5 from the first rotation axis 101 to an end of the image display unit 41 on the side close to the double-axis hinge mechanism 50 is made larger than a distance h6 from the first rotation axis 101 to an upper end of the external microphone holder 43a. Thus, the image display unit 41 is not brought in contact with the external microphone holder 43a, even if the image display unit 41 is rotated about the second rotation axis 102 in the state of FIG. 25.

Figure 26:
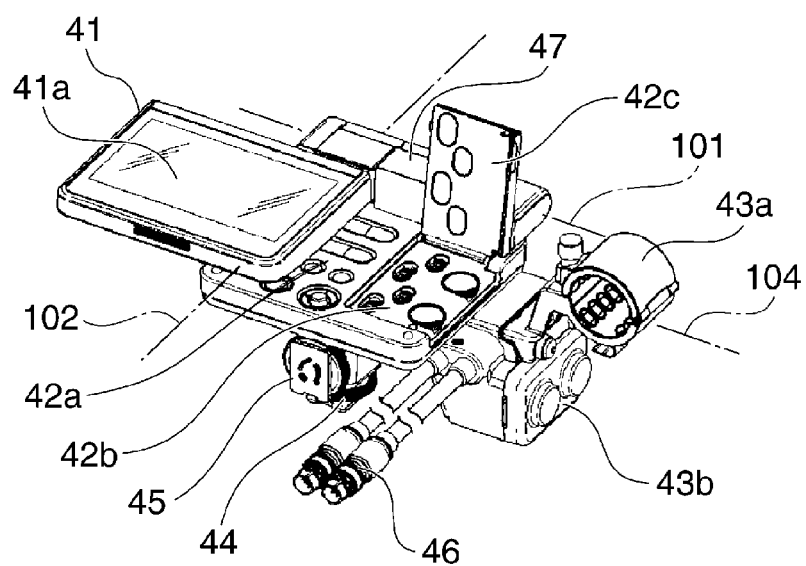
FIG. 26 is a perspective view showing a state where a cover member of the operation unit is opened in the state of FIG. 22 where the image display screen of the image display unit is directed upward.
Figure 27:
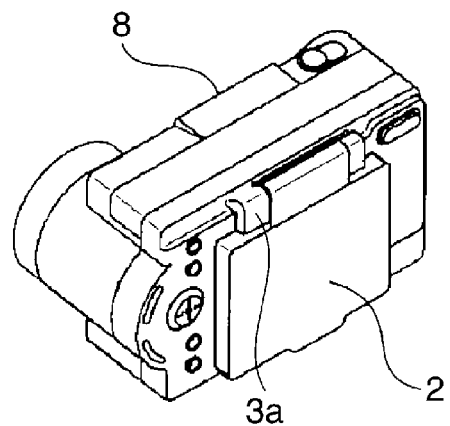
FIG. 27 is a perspective view showing an example of a conventional digital camera.
Figure 28:
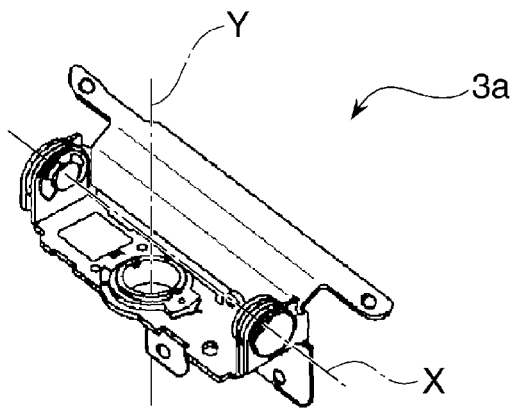
FIG. 28 is a perspective view of a mounting member through which a monitor block, which is a display device, is mounted to a camera main unit.
Figure 29:
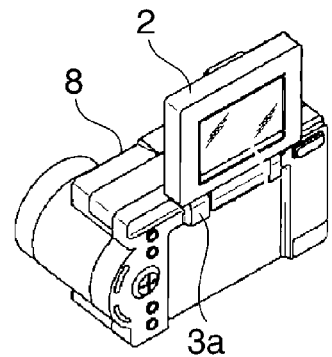
FIG. 29 is a perspective view showing a state obtained by rotating the monitor block by 180 degrees about a first rotation axis from the state of FIG. 27.
Figure 30:
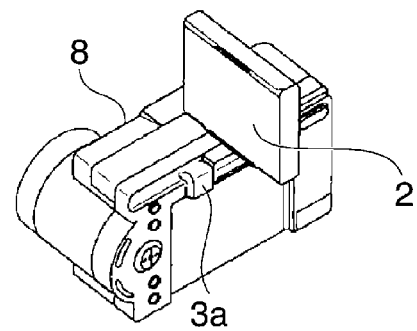
FIG. 30 is a perspective view showing a state obtained by rotating the monitor block by 270 degrees about a second rotation axis from the state of FIG. 29.
Figure 31:
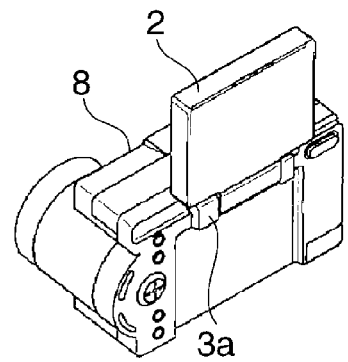
FIG. 31 is a perspective view showing a state obtained by rotating the monitor block by 180 degrees about the second rotation axis from the state of FIG. 29.
Figure 32:
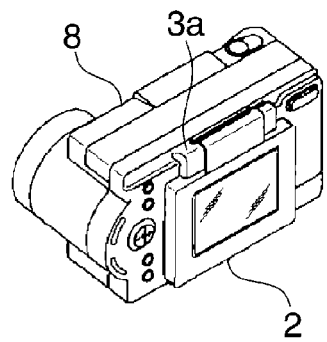
FIG. 32 is a perspective view showing a state obtained by rotating the monitor block by 180 degrees about the first rotation axis from the state of FIG. 31.

FIG. 26 shows in perspective view a state where the cover member 42c of the operation unit 42 is opened in the state of FIG. 22 where the image display screen of the image display unit 41 is directed upward.

As shown in FIG. 26, the cover member 42c can be rotated about a fourth rotation axis 104 in opening and closing directions. When the cover member 42c is open, the cover member 42c is brought in contact with and supported by the container unit 47, thereby preventing an excessive load from being applied to a rotary shaft of the cover member 42c, even if the cover member 42c is applied with an external force that acts to further open the cover member 42c.

As described above, in this embodiment, the image display unit 41 of the display device 40 is configured to be rotatable relative to the operation unit 42, and the operation unit 42 is configured to be rotatable relative to the camera main unit 10 or relative to the mounting unit 43 of the handle 30. It is therefore possible to improve the operability of the operation unit 42 when operated by the photographer/user facing the operation unit 42 in a state where the image display unit 41 has been adjusted to assume an angle where the photographer/user can easily view a displayed image.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-238796, filed Oct. 31, 2011, which is hereby incorporated by reference herein in its entirety.

What is claimed is:

1. An image display device comprising:
a mounting unit configured to be detachably mounted to an image pickup apparatus main unit;
a signal cable configured to be connected to the image pickup apparatus main unit;
an image display unit configured to display an image captured by the image pickup apparatus main unit;
an operation unit having an operation face on which an operation member is disposed;
a hinge mechanism configured to couple the image display unit to the operation unit such that the image display unit can be rotated relative to the operation unit; and
a rotary mechanism configured to couple the operation unit to the mounting unit such that the operation unit can be rotated relative to the mounting unit about a rotation axis perpendicular to the operation face of the operation unit,
wherein in a case where the operation unit is rotated relative to the mounting unit, the image display unit and the hinge mechanism are rotated together with the operation unit.

2. The image display device according to claim 1,
wherein the mounting unit has a first mount portion and a second mount portion,
wherein the first mount portion is detachably coupled to the image pickup apparatus main unit, and
wherein the second mount portion is detachably coupled to a handle which is mounted to the image pickup apparatus main unit.

3. The image display device according to claim 1,
wherein the hinge mechanism is a double-axis hinge mechanism that couples the image display unit to the operation unit such that the image display unit can be rotated relative to the operation unit about a first rotation axis and about a second rotation axis extending perpendicular to the first rotation axis.

4. An image display device comprising:
a mounting unit configured to be detachably coupled to an image pickup apparatus main unit;
an image display unit configured to display an image captured by the image pickup apparatus main unit;
an operation unit configured to be operated to control at least one of the image pickup apparatus main unit and the image display unit;
a hinge mechanism configured to couple the image display unit to the operation unit such that the image display unit can be rotated relative to the operation unit; and
a rotary mechanism configured to couple the operation unit to the mounting unit such that the operation unit can be rotated relative to the mounting unit about a rotation axis perpendicular to an operation face of the operation unit,
wherein the hinge mechanism is a double-axis hinge mechanism that couples the image display unit to the operation unit such that the image display unit can be rotated relative to the operation unit about a first rotation axis and about a second rotation axis extending perpendicular to the first rotation axis, and wherein a distance from the first rotation axis to an end of an image display screen of the image display unit on a side close to the hinge mechanism is greater than a distance from the first rotation axis to a bottom face of the operation unit.

5. An image display device comprising:
a mounting unit configured to be detachably coupled to an image pickup apparatus main unit;
an image display unit configured to display an image captured by the image pickup apparatus main unit;
an operation unit configured to be operated to control at least one of the image pickup apparatus main unit and the image display unit;
a hinge mechanism configured to couple the image display unit to the operation unit such that the image display unit can be rotated relative to the operation unit; and
a rotary mechanism configured to couple the operation unit to the mounting unit such that the operation unit can be rotated relative to the mounting unit about a rotation axis perpendicular to an operation face of the operation unit,
wherein the hinge mechanism is a double-axis hinge mechanism that couples the image display unit to the operation unit such that the image display unit can be rotated relative to the operation unit about a first rotation axis and about a second rotation axis extending perpendicular to the first rotation axis, and
wherein a distance from the first rotation axis to an end of the image display unit on a side close to the hinge mechanism is greater than a distance from the first rotation axis to an upper end of an external microphone holder provided in the mounting unit.

6. The image display device according to claim 5, wherein the second rotation axis is on a side opposite from the external microphone holder with respect to a widthwise center line of the operation unit.

7. The image display device according to claim 3, wherein in a state where the image display unit is closed relative to the operation unit about the first rotation axis with an image display screen of the image display unit directed upward, the image display unit is disposed at a location avoiding a signal level adjustment unit provided in the operation unit.

8. An image pickup apparatus comprising:
an image pickup apparatus main unit; and
an image display device configured to be detachably coupled to the image pickup apparatus main unit,
the image display device including:
a mounting unit configured to be detachably mounted to the image pickup apparatus main unit;
a signal cable configured to be connected to the image pickup apparatus main unit;
an image display unit configured to display an image captured by the image pickup apparatus main unit;
an operation unit having an operation face on which an operation member is disposed;
a hinge mechanism configured to couple the image display unit to the operation unit such that the image display unit can be rotated relative to the operation unit; and
a rotary mechanism configured to couple the operation unit to the mounting unit such that the operation unit can be rotated relative to the mounting unit about a rotation axis perpendicular to an operation face of the operation unit,
wherein in a case where the operation unit is rotated relative to the mounting unit, the image display unit and the hinge mechanism are rotated together with the operation unit.

9. The image display device according to claim 3, wherein a distance from the first rotation axis to an end of an image display screen of the image display unit on a side close to the hinge mechanism is greater than a distance from the first rotation axis to a bottom face of the operation unit.

10. The image display device according to claim 3, wherein a distance from the first rotation axis to an end of the image display unit on a side close to the hinge mechanism is greater than a distance from the first rotation axis to an upper end of an external microphone holder provided in the mounting unit.

11. The image display device according to claim 10, wherein the second rotation axis is on a side opposite from the external microphone holder with respect to a widthwise center line of the operation unit.

12. An image display device comprising:
a mounting unit configured to be detachably mounted to an image pickup apparatus main unit;
a signal cable configured to be connected to the image pickup apparatus main unit;
an image display unit configured to display an image captured by the image pickup apparatus main unit;
an operation unit having an operation face on which an operation member is disposed;
a hinge mechanism configured to couple the image display unit to the operation unit such that the image display unit can be rotated relative to the operation unit; and
a rotary mechanism configured to couple the operation unit to the mounting unit such that the operation unit can be rotated relative to the mounting unit about a rotation axis perpendicular to the operation face of the operation unit,
wherein in a case where the operation unit is rotated relative to the mounting unit, the image display unit and the hinge mechanism are rotated together with the operation unit, and
wherein the hinge mechanism is a double-axis hinge mechanism that couples the image display unit to the operation unit such that the image display unit can be rotated relative to the operation unit about a first rotation axis and about a second rotation axis extending perpendicular to the first rotation axis.

13. An image pickup apparatus comprising:
an image pickup apparatus main unit; and
an image display device configured to be detachably coupled to the image pickup apparatus main unit,
the image display device including:
a mounting unit configured to be detachably mounted to the image pickup apparatus main unit;
a signal cable configured to be connected to the image pickup apparatus main unit;
an image display unit configured to display an image captured by the image pickup apparatus main unit;
an operation unit having an operation face on which an operation member is disposed;
a hinge mechanism configured to couple the image display unit to the operation unit such that the image display unit can be rotated relative to the operation unit; and
a rotary mechanism configured to couple the operation unit to the mounting unit such that the operation unit can be rotated relative to the mounting unit about a rotation axis perpendicular to an operation face of the operation unit,
wherein in a case where the operation unit is rotated relative to the mounting unit, the image display unit and the hinge mechanism are rotated together with the operation unit, and
wherein the hinge mechanism is a double-axis hinge mechanism that couples the image display unit to the operation unit such that the image display unit can be rotated relative to the operation unit about a first rotation axis and about a second rotation axis extending perpendicular to the first rotation axis.

* * * * *